United States Patent [19]
Reece et al.

[11] Patent Number: 6,126,174
[45] Date of Patent: Oct. 3, 2000

[54] APPARATUS FOR MACHINING VEHICLE WHEEL BEAD SEATS

[75] Inventors: George M. Reece, Gainesville, Ga.; Geoffrey L. Gatton, Buena Park, Calif.

[73] Assignee: Hayes Lemmerz International, Inc., Northville, Mich.

[21] Appl. No.: 09/170,877

[22] Filed: Oct. 13, 1998

Related U.S. Application Data

[60] Provisional application No. 60/061,753, Oct. 13, 1997.

[51] Int. Cl.[7] .............................. B23B 5/34; B23B 31/42
[52] U.S. Cl. ........................ 279/2.24; 279/106; 279/141; 279/156; 29/802; 451/424
[58] Field of Search ................................ 29/802; 82/168, 82/169; 269/48.1; 279/106–109, 133, 137, 141, 156; 451/49, 51, 365, 379, 424

[56] References Cited

U.S. PATENT DOCUMENTS

| | | |
|---|---|---|
| 1,959,081 | 5/1934 | Le Jeune . |
| 2,194,936 | 3/1940 | Hatch . |
| 2,557,726 | 6/1951 | Caswell . |
| 3,131,946 | 5/1964 | Newhouser . |
| 3,323,808 | 6/1967 | Newhouser . |
| 5,464,233 | 11/1995 | Hanai . |
| 5,562,007 | 10/1996 | Seymour . |

FOREIGN PATENT DOCUMENTS

| | | |
|---|---|---|
| 353131588 | 11/1978 | Japan . |
| 357138551 | 8/1982 | Japan . |

*Primary Examiner*—Timothy V. Eley
*Attorney, Agent, or Firm*—MacMillan, Sobanski & Todd, LLC

[57] ABSTRACT

A wheel component has an annular extension formed upon an end. The extension is clamped to a wheel lathe and allows turning a tire bead seat upon the wheel component adjacent to the extension.

17 Claims, 8 Drawing Sheets

FIG. 8

APPARATUS FOR MACHINING VEHICLE WHEEL BEAD SEATS

CROSS REFERENCE TO RELATED APPLICATIONS

This application claims the benefit of U.S. Provisional Application No. 60/061,753, filed on Oct. 13, 1997.

BACKGROUND OF THE INVENTION

This invention relates in general to fixtures for mounting castings for vehicle wheels on machine tools during finishing operations and in particular to a chuck for mounting a wheel casting upon a wheel lathe for machining the casting to final shape.

Light weight alloy vehicle wheels are becoming increasingly popular. Such wheels typically include an annular wheel rim which carries a tire. A circular wheel disc is formed across one end of the wheel rim. The wheel disc usually includes a central hub portion supported within the wheel rim by a plurality of wheel spokes. A central pilot hole and plurality of wheel mounting holes are formed through the wheel hub.

One conventional process for manufacturing light weight alloy wheels involves pouring molten metal into a wheel mold to form a casting of the wheel. After the molten metal solidifies, the wheel casting is removed from the mold. The wheel casting is oversized and is machined to final shape. Alternately, a full face wheel disc which includes the outboard tire bead retaining flange is cast from a light weight alloy and machined to final shape. A partial wheel rim, which can be rolled from a strip of steel, is then welded to an inboard surface of the wheel disc to form a two piece wheel. Such a wheel combines the low cost and strength of a steel rim with a pleasing aesthetic appearance of a wheel disc cast from a light weight metal and is usually referred to as a bimetal wheel.

Machining the wheel or wheel disc casting typically includes multiple operations. Sawing machines cut any casting gates and risers from the wheel casting. A drilling machine is used to drill the wheel mounting holes through the wheel hub. The wheel casting is then mounted upon a wheel lathe for machining to its final shape. During the lathe operations, the inside surface of the wheel hub is usually faced to provide a flat mounting surface. Similarly, the outboard wheel hub surface is faced and both the inside and outside of the wheel rim are turned to their final shapes. The central pilot hole is usually drilled while the casting is clamped in the lathe for turning the inboard tire bead seat.

Figure 1:
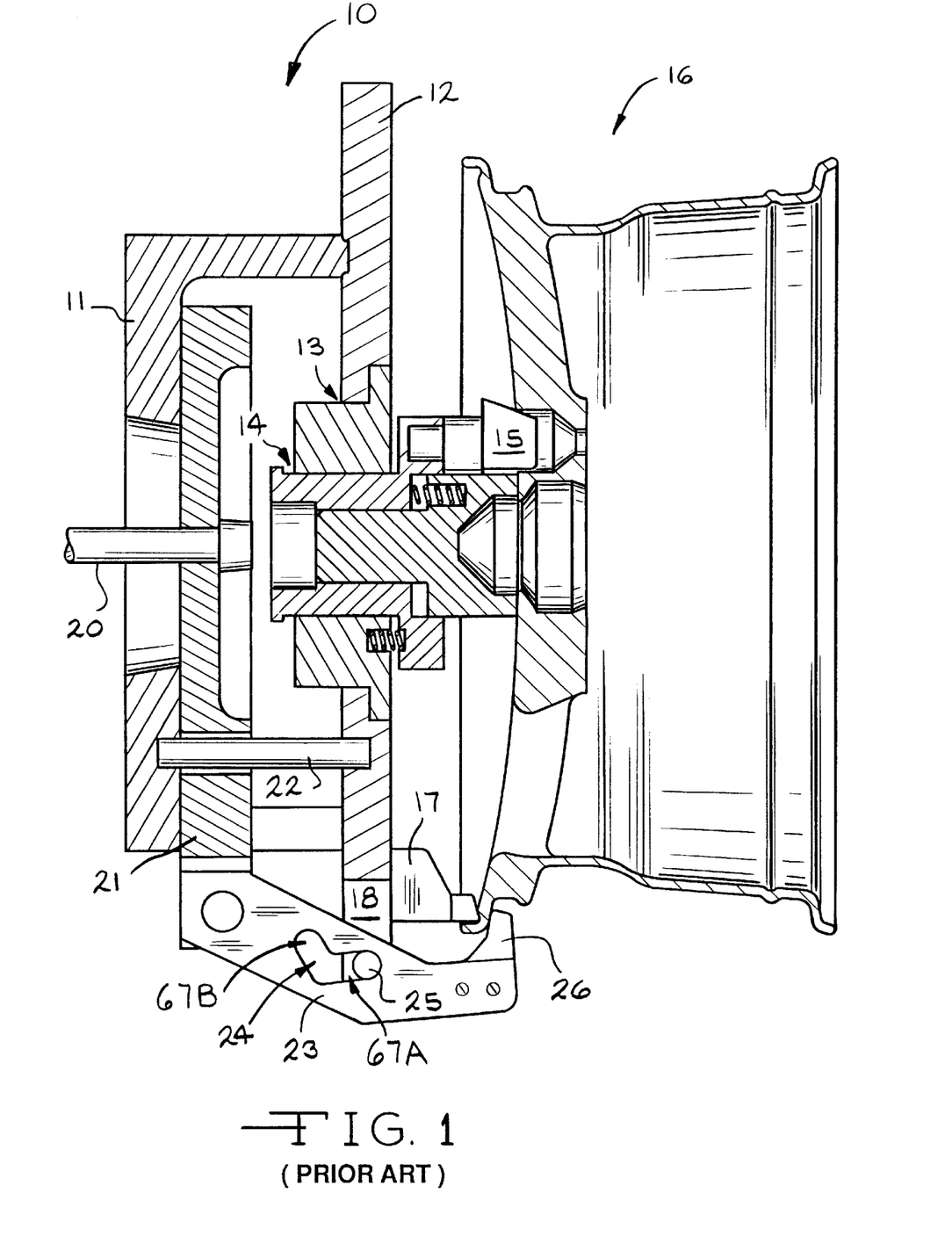
FIG. 1 is a sectional view of a wheel lathe chuck in accordance with the prior art.

Referring now to the drawings, there is shown generally at 10 in FIG. 1 a sectional view of a prior art chuck for clamping a wheel casting on a wheel lathe (not shown). The chuck 10 includes a cylindrical riser adapter 11 which is attached to the rotatable spindle of a wheel lathe (not shown) by conventional means. The riser adapter 11 supports a circular face plate 12. The face plate 12 has a center opening 13 formed therethrough which receives a generally cylindrical center assembly 14. The center assembly carries a plurality of locator pylons 15 (one shown) which position a wheel casting 16 upon the chuck 10. The face plate 12 also carries a plurality of part rests 17 (one shown) which are attached about the circumference thereof. A plurality of slots 18 (one shown) are formed in the outer edge of the face plate 12 and extend inward in a radial direction.

An actuator rod 20 extends axially into the riser adapter 11. A circular yoke plate 21 is disposed within the riser adapter 11 and attached to the end of the actuator rod 20. A plurality of guide pins 22 (one shown) extend between the riser adapter 11 and the face plate 12 and pass through apertures formed in the yoke plate 21. The actuator rod 20 and yoke plate 21 are movable in an axial direction by a conventional mechanism (not shown). A plurality of external arms 23 (one shown) are pivotally mounted upon tabs which extend radially from the circumference of the yoke plate 21. A generally L-shaped arm guide slot 24 extends through each arm 23. A first end of each arm 23 is received by an associated face plate arm slot 18. An arm guide pin 25 extends transversely through the arm guide slot 24. A jaw insert 26 is secured to a second end of each of the arms 23.

During the machining operations, the actuator rod 20 and yoke plate 21 are moved to the right in FIG. 1. As the yoke plate 21 moves, the arm guide slots 24 cooperate with the arm guide pins 25 to urge the arms 23 and jaw inserts 26 in an outward radial direction, thereby opening the chuck 10. The wheel casting 16 is then placed on the locator pylons 15 and the actuator rod 20 and yoke plate 21 are moved to the left in FIG. 1. As the yoke plate 21 moves, the arm guide slots 24 cooperate with the arm guide pins 25 to urge the arms 23 and jaw inserts 26 in an inward radial direction, closing the chuck 10 upon the wheel casting 16. The jaw inserts 26 cooperate with the part rests 17 to clamp the wheel casting 16 in the chuck 10.

SUMMARY OF THE INVENTION

This invention relates to an improved chuck for mounting a wheel casting upon a wheel lathe for machining the casting to final shape.

As illustrated in FIG. 1, conventional wheel lathe chucks clamp the ends of a wheel casting to a wheel lathe. Typically, the chuck arms 23 and jaw inserts 26 extend over the axial end portions of the casting which are turned on the wheel lathe to form the tire bead seats. It is necessary to remove, reverse and reclamp the casting to turn the second tire bead seat. The pilot hole in the center of the hub is typically drilled while the casting is clamped in the lathe for turning the inboard tire bead seat. Because wheel casting is removed from the wheel lathe chuck between machining operations, it can be difficult to control the radial runout between the tire bead seats and between the pilot hole and the tire bead seats. Typically, the radial distance between the bead seat and pilot hole is monitored for an order of wheels to demonstrate uniformity of the vehicle wheels as a criteria for customer acceptance. Accordingly, it would be desirable to reduce the radial runout by drilling the pilot hole and turning the tire bead seats while the wheel casting remains clamped in a single chuck during these machining operations.

The present invention contemplates a wheel component and clamping device assembly which includes an annular wheel component having an annular clamping flange extending axially from a tire bead seat portion of the component and a support structure adapted to be secured to a lathe spindle. The invention also includes a circular support ring mounted upon the support structure having a plurality of rigid arms movably mounted thereupon. Each of the arms are movable between a first and a second position, each of the arms having a first and a second end with the second end clamping the clamping flange against the support ring when the arms are in the second position whereby the tire bead seat portion adjacent to the clamping flange is exposed for a turning operation.

The invention also contemplates a plurality of part rests mounted upon the support ring. The part rests are equally spaced about the circumference of the support ring with each of the part rests corresponding to one of the movable arms. The part rests cooperate with the corresponding movable arms to clamp the wheel component upon the support ring. Additionally, the part rests can cooperate with the clamping flange to locate the wheel component upon the support ring. Alternately, the support ring can carry a plurality of part locators. The part locators are equally spaced about the circumference of the support ring and cooperate with the clamping flange to position the wheel component upon the support ring.

The assembly also can include an actuator plate which is axially shiftable between a first axial position and a second axial position. The first ends of each of the movable rigid arms are pivotally connected to the actuator plate with the arms being in the first arm position when the actuator plate is in the first axial position and in the second arm position when the actuator plate is in the second axial position.

The present invention also contemplates a process for finishing a wheel component in which the wheel component is formed having a first annular flange portion and a second clamping flange portion formed adjacent to the first flange and extending axially therefrom. The clamping flange is clamped in a wheel lathe chuck having a plurality of movable arms which cooperate with an outside surface of the clamping flange to secure the wheel component in the chuck while leaving the portion of the wheel component adjacent to the clamping flange exposed for machining. A tire bead seat is turned on wheel component adjacent to the first annular flange. The wheel component is then removed from the wheel lathe chuck and the clamping flange removed from the wheel component. The process allows turning both an inboard tire bead seat and an outboard tire bead seat while the wheel component remains clamped to the wheel chuck. The process can further include forming a pilot hole through the center of the wheel component.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 2:
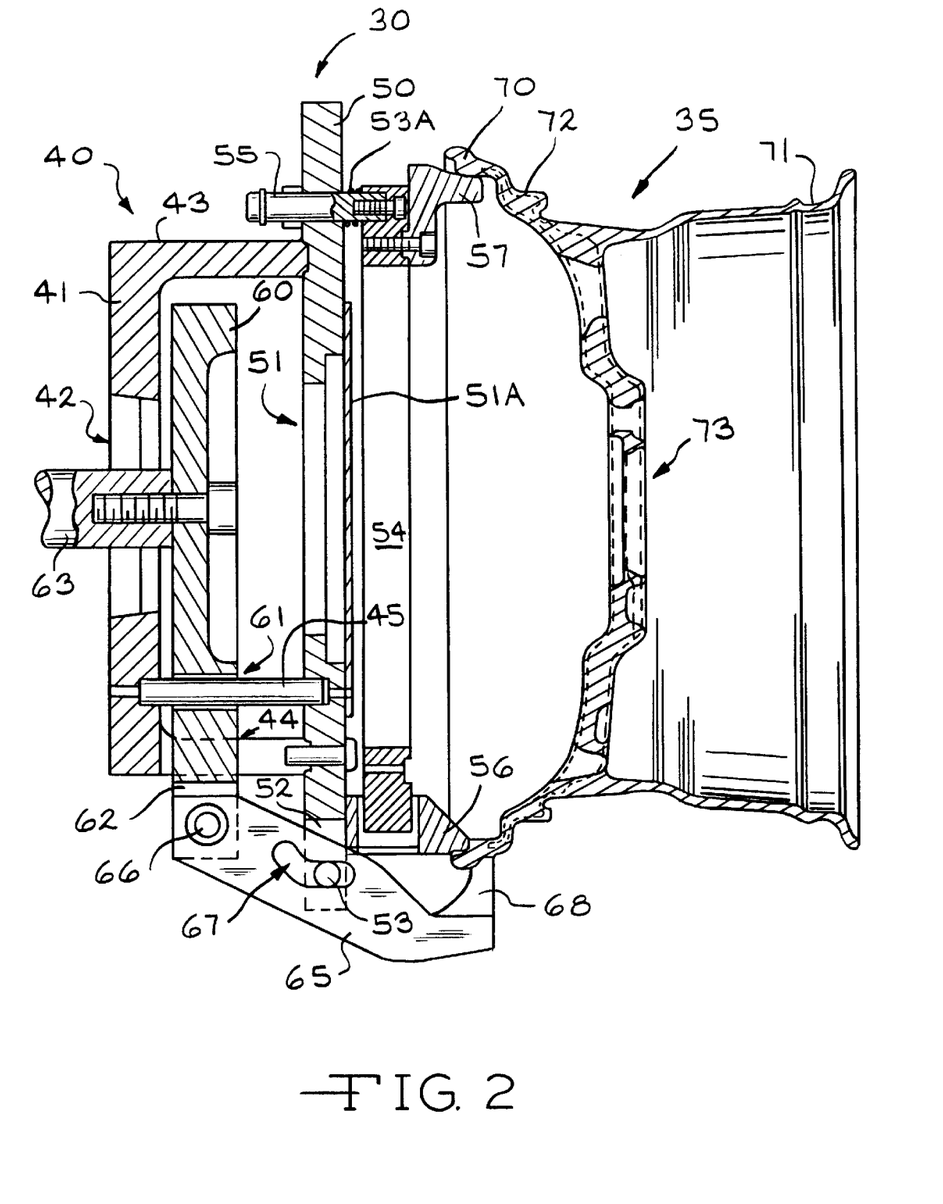
FIG. 2 is a sectional view of an improved wheel lathe chuck in accordance with the present invention.

Referring again to the drawings, there is shown in FIG. 2 a sectional view of an improved chuck 30 for mounting a vehicle wheel casting upon a wheel lathe (not shown) in accordance with the invention. In the interest of simplicity, not all of the fasteners which secure components of the chuck 30 to one another are shown in FIG. 2. A typical one piece vehicle wheel casting 35, which will be described below, is shown clamped on the chuck 30.

The chuck 30 includes a riser adapter 40 which can be secured to the rotatable spindle of a lathe (not shown) by conventional means. The riser adapter 40 includes a circular base 41 which has a central circular opening 42 formed therethrough. The adapter 40 also includes a cylindrical sleeve 43 extending axially from the base 41. The sleeve 43 has a plurality of axial slots 44 (one shown) formed therethrough. The slots 44 are spaced equally about the circumference of the sleeve 43. The purpose of the slots 44 will be explained below. The adapter 40 further carries a plurality of guide pins 45 (one shown) which extend axially from the base 41.

The chuck 30 also includes a circular face plate 50 which is secured to the end of the adapter plate sleeve 43. Similar to the face plate 12 shown in FIG. 1, the face plate 50 has a central circular opening 51 formed therethrough. A cover 51A extends across the opening 51. A plurality of radial slots 52 (one shown) are formed in the outer edge of the face plate 50. The slots 52 are spaced equally about the circumference of the face plate 50 and aligned with the slots 44 formed in the riser adapter 40. Each slot 52 has an arm guide pin 53 mounted transversely thereacross. The purpose for the slots 52 and the arm guide pins 53 will be explained below.

An annular locator ring 54 is mounted upon the face plate 50 with a plurality of locator pins 55 (one shown). The locator ring 54 is axially movable relative to the face plate 50. A plurality of compression springs 53A (one shown) are disposed between the locator ring 54 and the face plate 50. A plurality of part rests 56 (one shown) are mounted upon the surface of the locator ring 54 which is opposite from the face plate 50. The part rests 56 are spaced equally about the circumference of the locator ring 54. Similarly, a plurality of equally spaced part locators 57 are mounted upon the circumference of the locator ring 54. In the preferred embodiment, the part locators 57 are tapered, as illustrated in FIG. 2, to facilitate mounting the wheel casting 35 upon the chuck 30.

The chuck 30 further includes an axially movable yoke plate 60 which is disposed within the riser adapter sleeve 43. The yoke plate 60 is circular and has a plurality of guide pin holes 61 formed therethrough. Each of the guide pin holes 61 slidably receives one of the guide pins 45. The yoke plate 60 also has a plurality of radially extending tabs 62 (one shown) which correspond to the adapter plate slots 44. The tabs 62 are spaced equally about the circumference of the yoke plate 60 and each tab 62 extends through one of the adapter plate slots 44. An actuator rod 63 is secured to the center of the yoke plate 60 and extends axially through the adapter plate opening 42. The actuator rod 63 is connected to a conventional mechanism (not shown) for axially shifting the actuator rod 63 and yoke plate 60.

A plurality of rigid arms 65 (one shown) are pivotally mounted on the ends of the yoke plate tabs 62. A first end of each arm 65 is secured to each yoke plate tab 62 with a pivot pin 66. The center portion of each arm 65 has a generally L-shaped arm guide slot 67 formed therethrough. Each arm guide slot 67 receives a corresponding arm guide pin 53. A removable jaw insert 68, which is shaped to clamp over a portion of a vehicle wheel casting, is attached to a second end of each arm 65.

The operation of the improved chuck 30 is similar to the operation of the prior art chuck 10 described above. Movement of the actuator rod 63 and yoke plate 60 to the right in FIG. 2 causes the arms 65 to pivot outward, opening the chuck 30. A wheel casting 35 can then be positioned upon the locators 57. The actuator rod 63 and yoke plate 60 are moved to the left in FIG. 2 to pivot the arms 65 inward, closing the chuck 30 and clamping the wheel casting 35 between the part rests 56 and the jaw inserts 68.

The chuck 30 is operative to clamp a casting 35 for a one piece vehicle wheel to a wheel lathe for machining the casting 35 to its final shape. The present invention further contemplates that the casting 35 includes an additional clamping flange 70 which is formed upon the outboard end thereof. As shown in FIG. 2, the clamping flange 70 extends axially from the end of the casting 35 beyond the portion which will be formed into an outboard tire bead seat and an outboard tire bead retaining flange, as illustrated by the dashed lines. The clamping flange 70 is clamped between the jaw inserts 68 and part rests 56 to secure the wheel casting 35 to the wheel lathe. The portion of the casting 35 which will be machined into an outboard tire bead seat is not covered by the jaw inserts 68 and is thus exposed for machining. The casting 35 is then machined to its final shape, which is indicated by the broken line in FIG. 2. The outboard portion of the wheel casting 3 5 is shown as machined in FIG. 2. Thus, both an inboard tire bead seat 71 and an outboard tire bead seat 72 can be turned without removing the casting 35 from the chuck 30. Additionally, a pilot hole 73 can be drilled or bored through the wheel hub while the wheel casting 35 is held in the chuck 30.

Because the wheel casting 35 is not removed from the chuck 30 and reclamped therein between successive machining operations, it is possible to accurately control the radial runout between the inboard and outboard tire bead seats 71 and 72 and between the tire bead seats 71 and 72 and the pilot hole 73. Also, concentricity of the inboard and outboard tire bead seats is assured and lateral runout, as measured axially, between the tire bead seats 71 and 72 can be accurately controlled. After the wheel casting 35 is machined, the clamping flange 70 is cut or trimmed off the casting 35, leaving only the outboard tire bead retaining flange. While the preferred embodiment has been shown and discussed with the clamping flange 70 formed on the outboard end of the wheel casting 35, it will be appreciated that the invention also can be practiced with the clamping flange 70 formed on the inboard end of the wheel casting 35 (not shown).

The present invention further contemplates a multi-piece mold for casting the wheel casting 35. The mold is shown generally at 80 in FIG. 3. The individual pieces of the mold 80 are formed from cast iron or high carbon steel. The mold 80 includes a base member 81 which supports the other mold members. Two or more horizontally retractable side members 82 and 83 are carried by the base member 81. A vertically removable cup-shaped center core 84 having a cylindrical center portion 85 is disposed within the side members 82 and 83.

Figure 3:
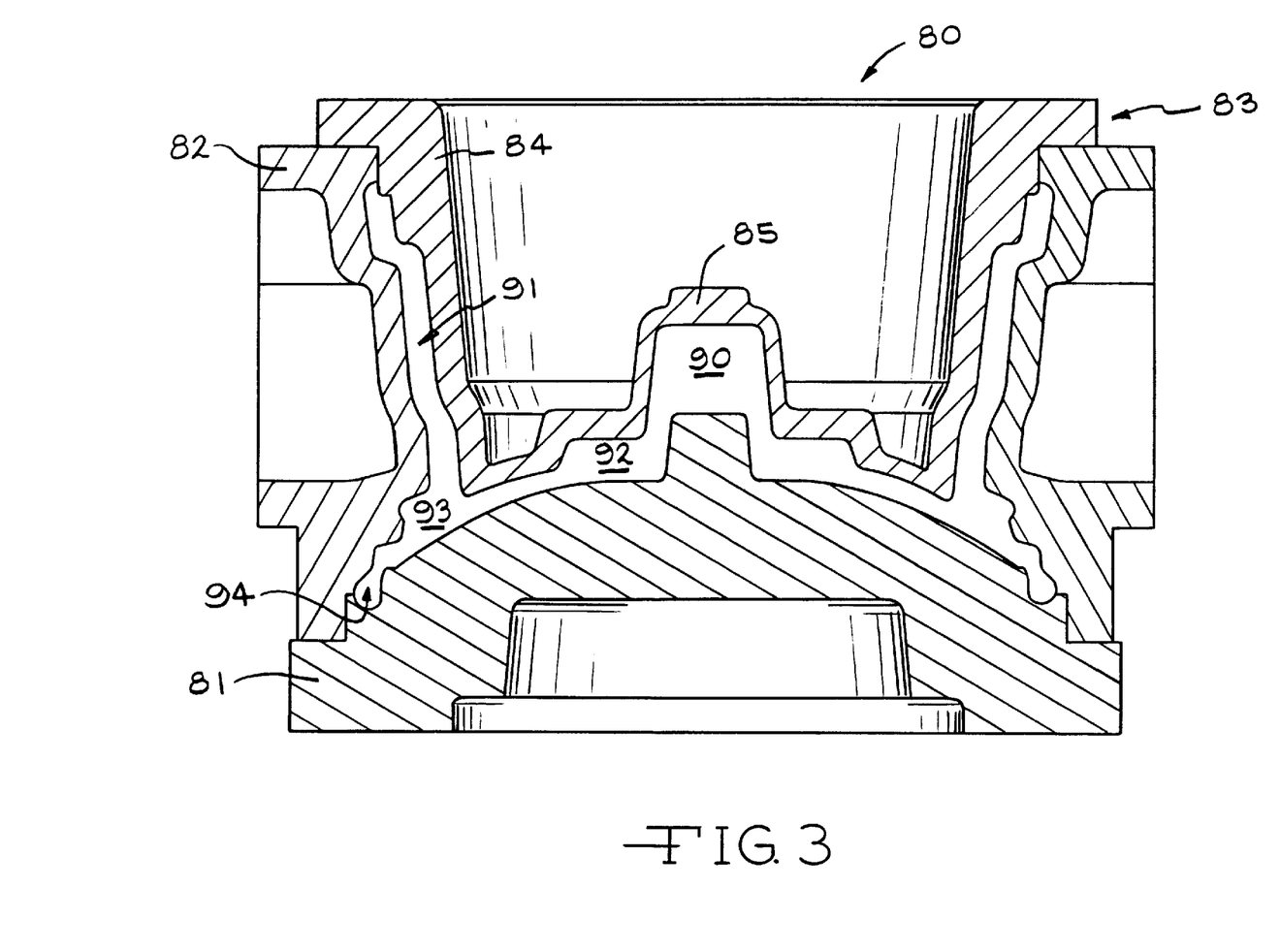
FIG. 3 is a sectional view of a multi-piece mold used to cast the wheel casting shown in FIG. 2.

The mold members 81, 82, 83 and 84, upon assembly, define a mold cavity 90. The cavity 90 includes an annular rim cavity 91 for casting the rim portion of the wheel and a disc shaped cavity 92 for casting the wheel disc. An annular sidewall cavity 93 is formed where the rim cavity 91 joins the disc cavity 92. An annular recess 94 is formed at the radially outermost portion of the sidewall cavity 93 for casting the additional clamping flange 70 on wheel castings cast in the mold 80.

Alternately, the wheel can be forged and machined to final shape. If the wheel is forged the dies (not shown) include a portion for forming an additional clamping flange on the end of the forging, similar to the cast wheel 35 shown in FIG. 2.

The present invention also contemplates a process for forming a vehicle wheel which utilizes the improved chuck 30. The process is illustrated by the flow chart shown in FIG. 4. In functional block 100, a wheel is formed by a conventional method, such as casting or forging. The wheel includes an additional clamping flange, which can be formed upon either the outboard or inboard end of the wheel.

Figure 4:
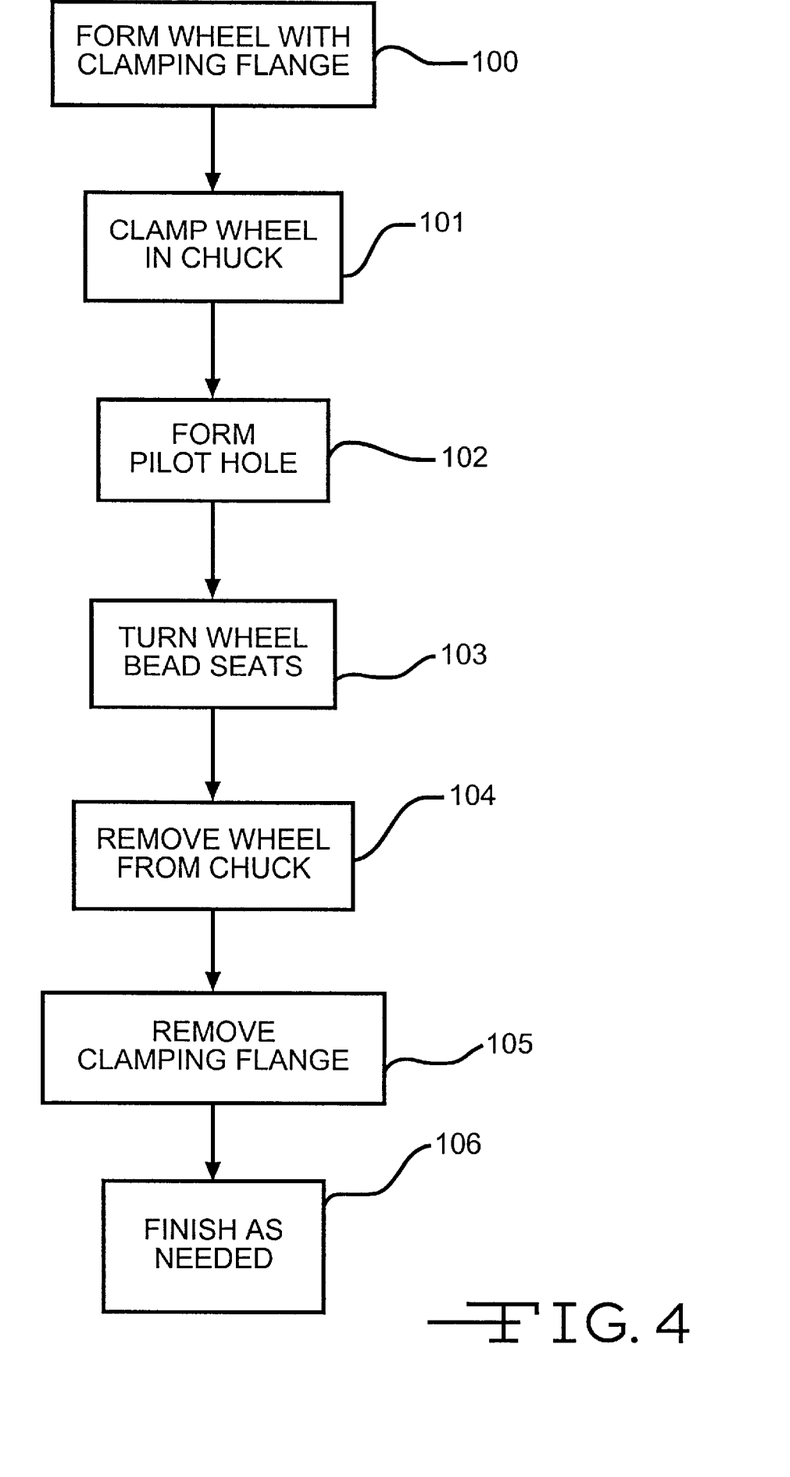
FIG. 4 is a flow chart for a process for forming a wheel which utilizes the wheel chuck shown in FIG. 2.

The clamping flange is clamped in the improved chuck in functional block 101. The pilot hole is formed in functional block 102 by a conventional process, such as drilling or boring, and the outboard and inboard tire bead seats are turned in functional block 103. It will be appreciated that the invention also can be practiced by turning the tire bead seats before forming the pilot hole. Because the wheel remains securely clamped in the chuck during the boring and turning operations, the radial runouts measured between the tire bead seats and the tire bead seats and the pilot hole are minimized. Additionally, the lateral runout, as measured axially, between the tire bead seats can be accurately controlled.

While the wheel is clamped in the chuck, other machining operations can optionally be completed. For example, the outside of the wheel rim can be turned and the inboard surface of the wheel hub can be faced. Once the machining operations are completed, the wheel is removed from the chuck in functional block 104. The additional flange is removed by trimming or another conventional operation in functional block 105. The wheel is then further finished as needed in functional block 106.

Figure 5:
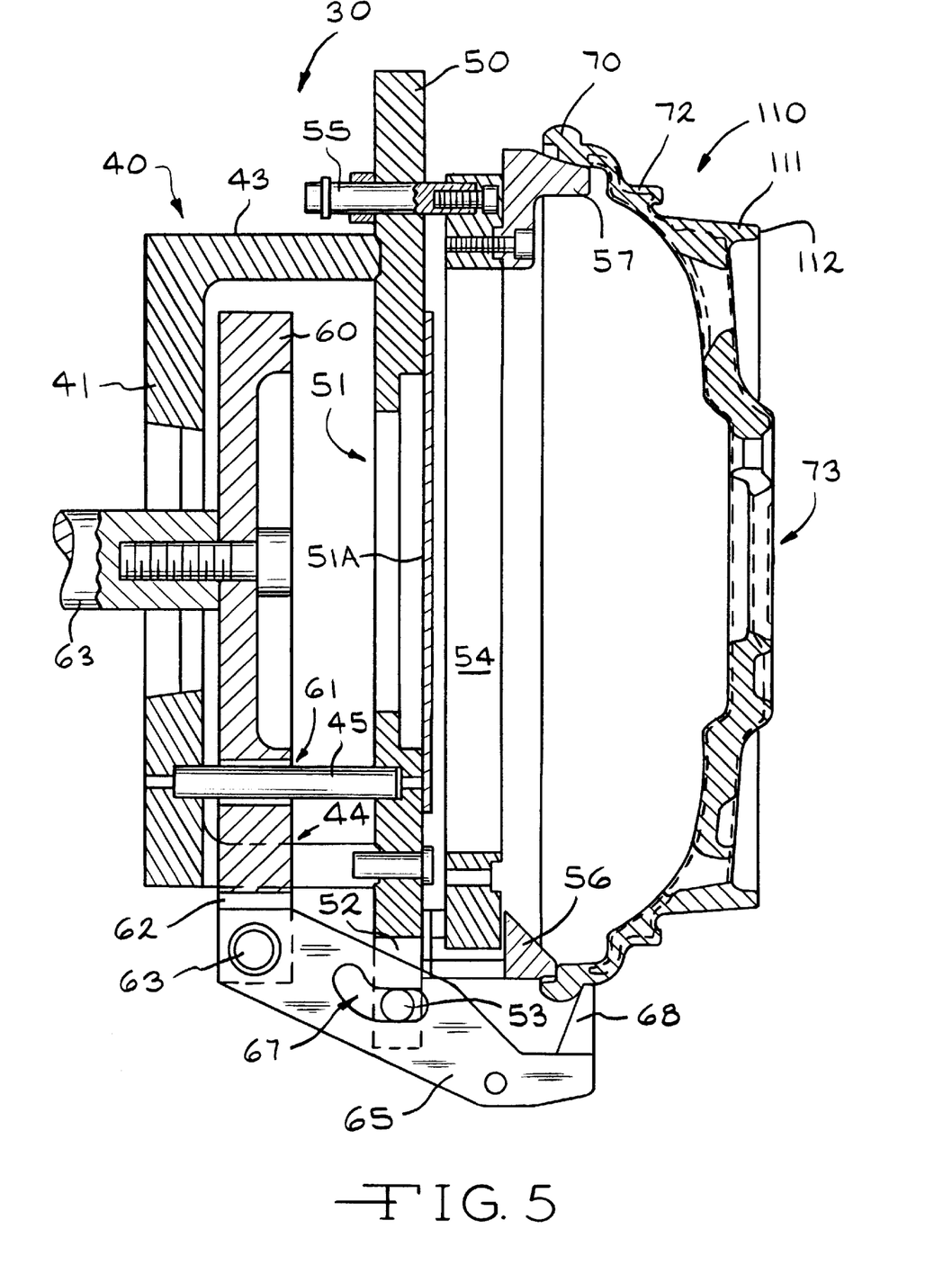
FIG. 5 is a sectional view of the wheel chuck shown in FIG. 2 being utilized to finish a full face wheel disc casting.

The invention also can be practiced on two piece wheels having a full face wheel disc welded or otherwise secured to a partial wheel rim. The wheel disc and rim can be formed from the same metal, or from different metals. The improved chuck 30 described above is used to machine the wheel disc, as illustrated in FIG. 5 where a full face wheel disc 110 is clamped in the chuck 30. Components shown in FIG. 5 which are identical to components shown in FIG. 2 have the same numerical designators.

The full face wheel disc 110 includes the additional clamping flange 70 which was described above and which is clamped by the improved chuck 30. The inboard surface of the wheel disc includes a cylindrical shoulder 111 which extends axially therefrom. The inboard end of the shoulder 111 is faced to form an annular surface 112. The outboard end of a partial wheel rim (not shown) is welded to the annular surface to form the two piece wheel. It will be appreciated that the wheel rim can be welded to the wheel disc 110 at other locations than the one shown in FIG. 5. For example, the wheel rim can be welded to the wheel disc in the area of the tire bead seat.

The wheel disc 110 and chuck 30 are rotated by the wheel lathe. While the wheel is rotated the pilot hole 73 is formed by drilling or boring and the outboard tire bead seat 72 is turned. Accordingly, the runout between the pilot hole 73 and the outboard tire bead seat 72 is minimized. Additional machining of the wheel disc 110 can optionally be completed while the wheel disc 110 is clamped in the chuck 30.

Figure 6:
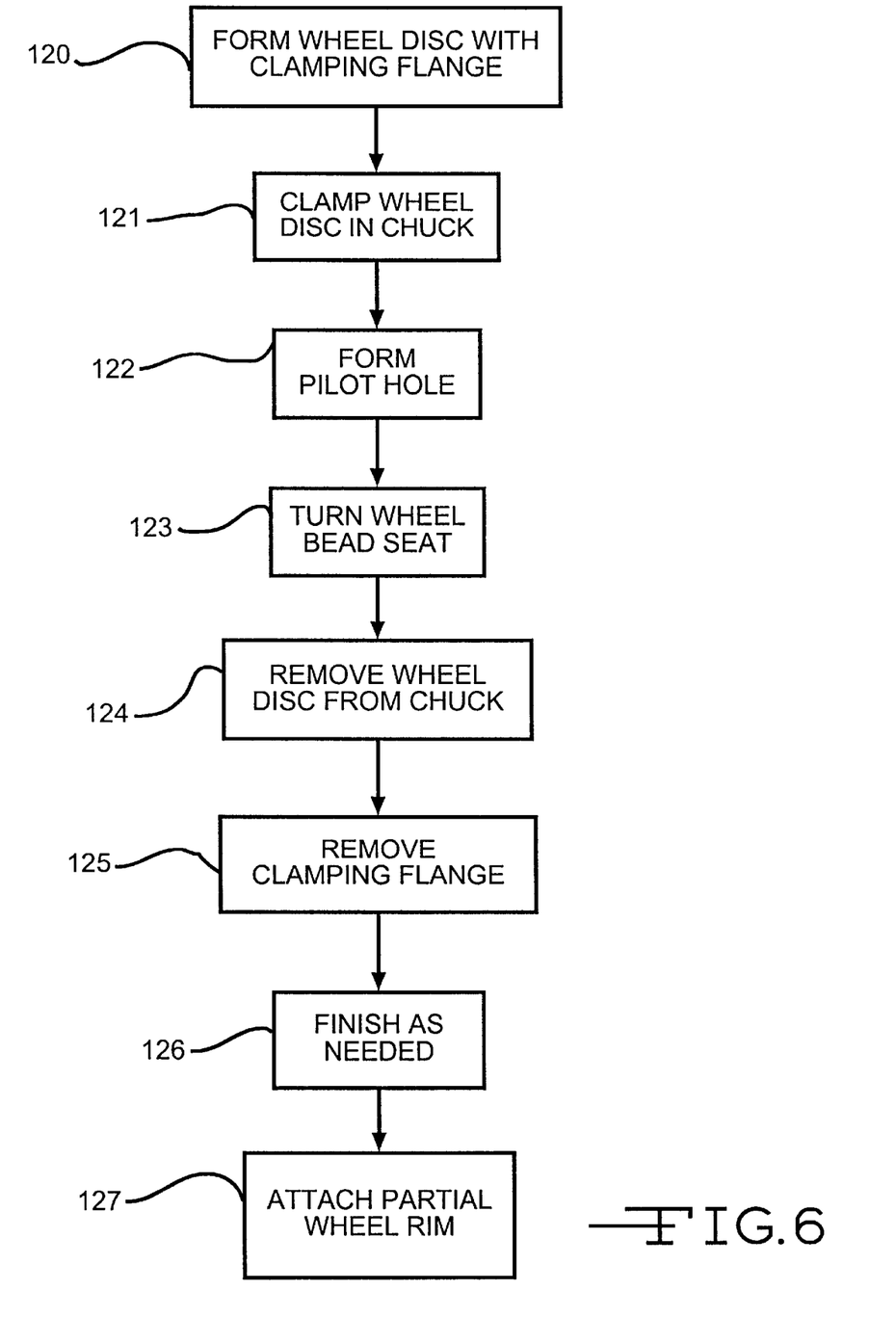
FIG. 6 is a flow chart for a process for forming a wheel which utilizes the wheel disc shown in FIG. 5.

A process for forming a two piece wheel with the improved chuck is illustrated by the flow chart shown in FIG. 6. In functional block 120, a full face wheel disc is formed by a conventional method, such as casting or forging. As described above, the wheel mold or die set includes an additional annular recess on the outboard end of the mold or die cavity which forms the additional clamping flange on the wheel disc. Accordingly, a wheel disc formed with the mold or die set includes a clamping flange.

The clamping flange is clamped in the improved chuck in functional block 121. The pilot hole is formed in functional block 122 by a conventional process, such as drilling or boring, and the outboard tire bead seat is turned in functional block 123. Because the wheel disc remains securely clamped in the chuck during the boring and turning operations, the radial runout measured between the tire bead seat and the pilot hole is minimized. It will be appreciated that the invention also can be practiced by turning the tire bead seat before boring the pilot hole.

While the wheel disc is clamped in the chuck, other machining operations can optionally be completed. For example, the outside of the wheel disc can be turned and the inboard surface of the wheel hub can be faced. Once the machining operations are completed, the wheel disc is removed from the chuck in functional block 124. The clamping flange is removed by trimming or another conventional operation in functional block 125. The wheel disc is then further finished as needed in functional block 126. In functional block 127, a partial wheel rim is attached to the wheel disc by a conventional method, such as arc or friction welding.

Figure 7:
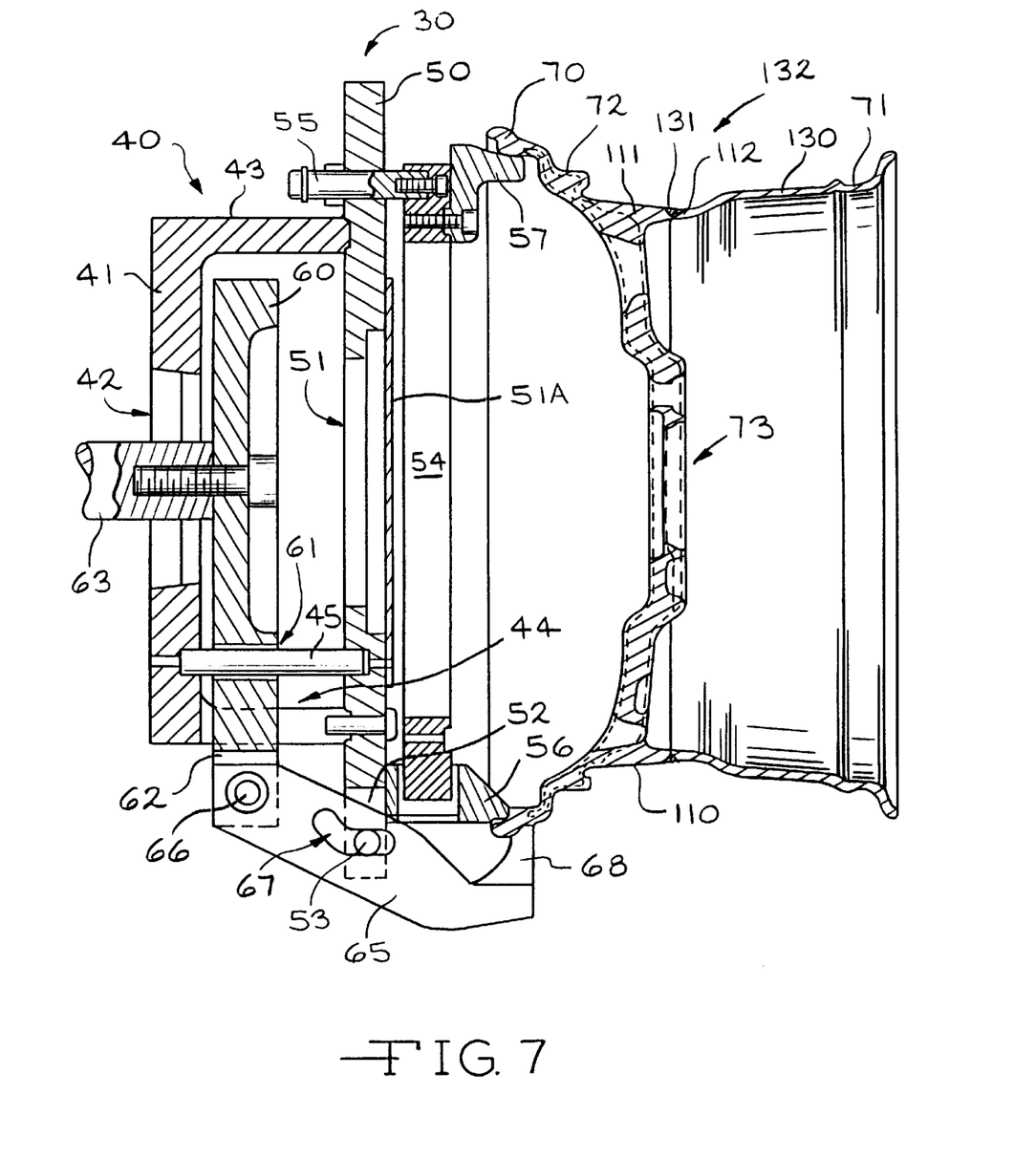
FIG. 7 is a sectional view of the wheel chuck shown in FIG. 2 being utilized to finish a two piece wheel.

Alternately, a partial wheel rim 130 can be attached to the wheel disc 110 with a continuous circumferential weld 131 to form a wheel assembly 132 before the tire bead seats 71 and 72 are turned or the pilot bore 73 formed. The wheel assembly 132 is then clamped in the chuck 30 for turning both tire bead seats 71 and 72 and forming the pilot bore 73, as is illustrated in FIG. 7. Components shown in FIG. 7 which are identical to components shown in FIGS. 2 and 5 have the same numerical designators. The alternate process allows turning both tire bead seats with the two piece wheel chucked once to assure concentricity thereof while minimizing the radial rum out therebetween.

Figure 8:
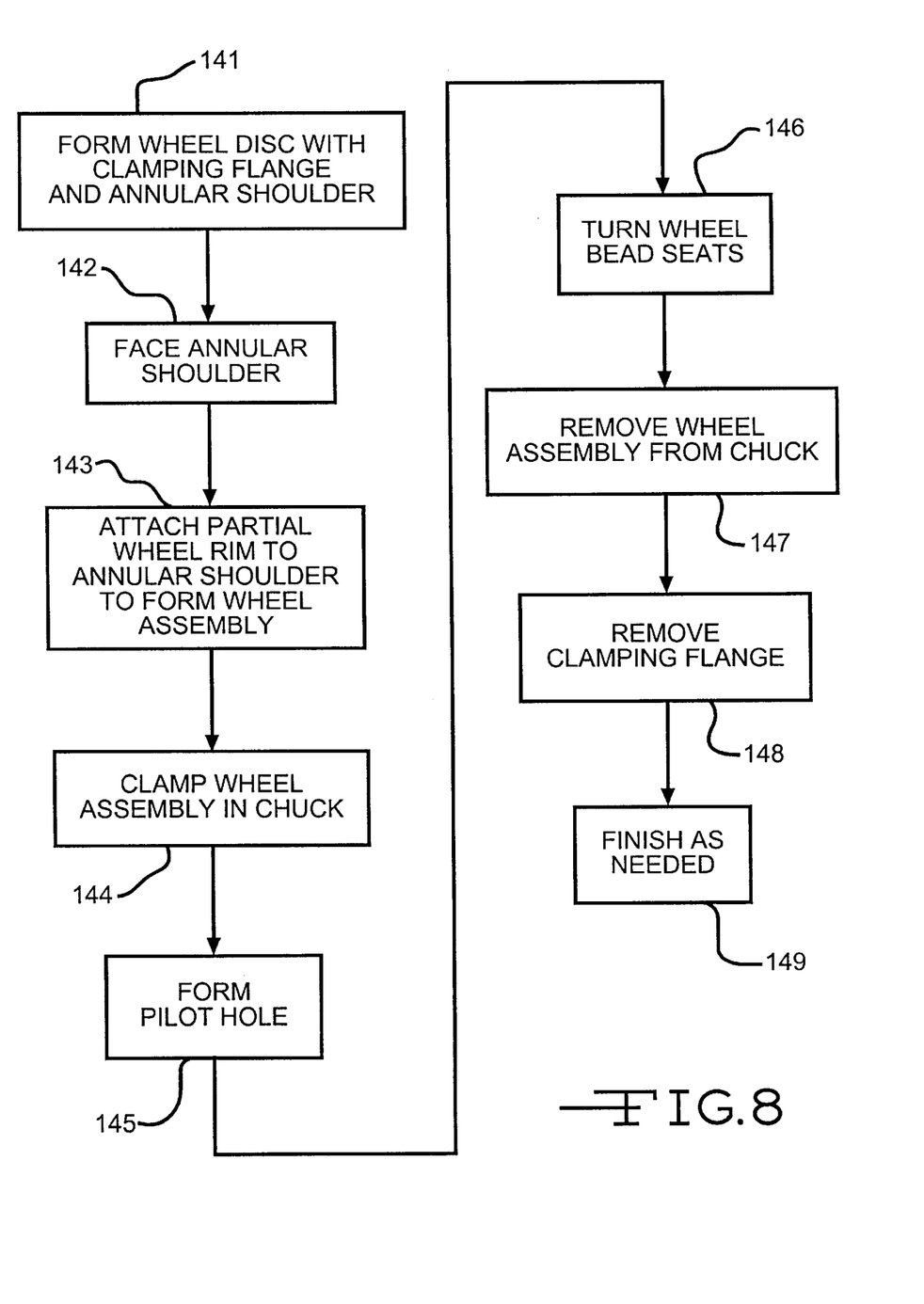
FIG. 8 is a flow chart for a process for forming the wheel shown in FIG. 7.

A process for fabricating the wheel shown in FIG. 7 is illustrated by a flow chart in FIG. 8. In functional block 141, a full face wheel disc is formed by a conventional process, such as casting or forging. The wheel disc includes an additional clamping flange formed on its outboard end and an annular shoulder formed on an inboard surface. In functional block 142, the shoulder is faced to provide a flat annular surface. A partial wheel rim is attached to the annular surface in functional block 143 by a conventional process, such as friction or arc welding, to form a wheel assembly.

In functional block 144, the clamping flange formed upon the wheel disc is clamped in the improved chuck to mount the wheel assembly upon a wheel lathe. A pilot hole is formed through the center of the wheel hub in functional block 145 by a conventional process, such as drilling or boring. The inboard and outboard tire bead seats are turned in functional block 146. It will be appreciated that the invention also can be practiced by turning the tire bead seats before forming the pilot hole. Because the wheel assembly remains clamped in the wheel chuck during these machining operations, concentricity of the tire bead seats is assured while the radial runouts between the tire bead seats and between the tire bead seats and the pilot hole are minimized. Additionally, the lateral runout, as measured axially, between the tire bead seats can be accurately controlled.

While the wheel assembly is clamped in the chuck, other finishing operations can optionally be carried out upon the wheel assembly. For example, the outside surface of the wheel disc can be turned and the inboard surface of the wheel hub can be faced. Once the machining operations are completed, the wheel assembly is removed from the chuck in functional block 147. The additional flange is removed by trimming or another conventional operation in functional block 148. The wheel assembly is then further finished as needed in functional block 149.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An apparatus adapted to releasably clamp an annular clamping flange formed upon an end of a wheel component to a lathe spindle, the clamping flange adjacent to and extending axially from a tire bead seat portion of the wheel component, the apparatus comprising:

a support structure adapted to be secured to a lathe spindle;

a circular support ring mounted upon said support structure, said support ring being movable in an axial direction relative to said support structure;

a plurality of part rests mounted upon said support ring; and a plurality of rigid arms movably mounted upon said support structure, each of said arms corresponding to one of said part rests, said arms being movable between a first and a second position, each of said arms having a first and a second end with said second end adapted to clamp the clamping flange formed on the end of the wheel component against said corresponding part rest when said arms are in said second position whereby a tire bead seat portion of the wheel component which is adjacent to the clamping flange is exposed for a turning operation.

2. An assembly according to claim 1 wherein said part rests also are adapted to cooperate with the clamping flange to locate the wheel component upon said part rests.

3. An assembly according to claim 1 further including a plurality of part locators mounted upon said support ring, said part locators being equally spaced about the circumference of said support ring, said part locators being adapted to cooperate with the clamping flange to position the wheel component upon said part rests.

4. An apparatus according to claim 3 further including a yoke plate, said yoke plate being axially shiftable between a first axial position and a second axial position, said first ends of each of said arms being pivotally connected to said yoke plate with said arms being in said first arm position when said yoke plate is in said first axial position and in said second arm position when said yoke plate is in said second axial position.

5. An apparatus according to claim 4 wherein the wheel component includes a wheel rim and said arms are adapted to clamp said clamping flange of said wheel component against said part rests whereby both an inboard tire bead seat and an outboard tire bead seat can be turned upon said wheel rim when the wheel component is clamped against said part rests by said movable arms.

6. An apparatus according to claim 5 wherein the wheel component includes a wheel hub and said arms are adapted to clamp said clamping flange of said wheel component against said part rests whereby a pilot hole can be formed through said hub when the wheel component is clamped against said part rests by said movable arms.

7. An apparatus according to claim 4 wherein the wheel component includes a wheel disc having a central hub and said arms are adapted to clamp the clamping flange of the wheel component against said part rests whereby a tire bead seat which is adjacent to the clamping flange can be turned upon said wheel disc and a pilot hole formed through said hub when the wheel component is clamped against said part rests by said movable arms.

8. A wheel component and clamping device assembly comprising:
- an annular wheel component including a first annular flange portion formed adjacent to a tire bead seat portion of said component;
- a second annular clamping flange portion formed upon said wheel component adjacent to said first flange portion and extending axially therefrom;
- a support structure adapted to be secured to a lathe spindle;
- a circular support ring mounted upon said support structure;
- a plurality of part rests mounted upon said support ring; and
- a plurality of rigid arms movably mounted upon said support structure, each of said arms being movable between a first and a second position, each of said arms having a first and a second end with said second end clamping said clamping flange against said corresponding part rest when said arms are in said second position whereby said tire bead seat portion of said wheel component is exposed for a turning operation.

9. A wheel component and clamping device assembly according to claim 8 wherein said part rests also cooperate with said clamping flange to locate said wheel component upon said part rests.

10. A wheel component and clamping device assembly according to claim 8 further including a plurality of part locators mounted upon said support ring, said part locators being equally spaced about the circumference of said support ring, said part locators cooperating with said clamping flange to position said wheel component upon said part rests.

11. A wheel component and clamping device assembly according to claim 10 further including a yoke plate, said yoke plate being axially shiftable between a first axial position and a second axial position, said first ends of each of said arms being pivotally connected to said yoke plate with said arms being in said first arm position when said yoke plate is in said first axial position and in said second arm position when said yoke plate is in said second axial position.

12. A wheel component and clamping device apparatus according to claim 11 wherein said wheel component includes a wheel rim and said arms clamp said clamping flange of said wheel component against said part rests whereby both an inboard tire bead seat and an outboard tire bead seat can be turned upon said wheel rim while said wheel component remains clamped against said part rests by said movable arms.

13. A wheel component and clamping device apparatus according to claim 12 wherein said wheel component includes a wheel hub and said arms clamp said clamping flange of said wheel component against said part rests whereby a pilot hole can be formed through said hub while said wheel component remains clamped against said part rests by said movable arms.

14. A wheel component and clamping device according to claim 13 wherein the wheel component is a one-piece wheel casting.

15. A wheel component and clamping device according to claim 13 wherein the wheel component is a two-piece wheel.

16. A wheel component and clamping device according to claim 13 wherein the wheel component is a full face wheel disc casting.

17. A wheel component and clamping device apparatus according to claim 11 wherein said wheel component includes a wheel disc having a central hub and said arms clamp said clamping flange of said wheel component against said part rests whereby a tire bead seat can be turned upon said wheel disc and a pilot hole formed through said hub while said wheel component remains clamped against said part rests by said movable arms.

* * * * *